Patented July 22, 1952

2,604,495

UNITED STATES PATENT OFFICE 2,604,495

HYDROCARBON DEHYDROGENATION IN PRESENCE OF ADDED CARBON DIOXIDE

Eero O. Erkko, Wilmington, Del., assignor to Hercules Powder Company, Wilmington, Del., a corporation of Delaware No Drawing. Application July 21, 1948, Serial No. 40,011

7 Claims. (Cl. 260—683.3)

This invention relates to the preparation of olefins by the dehydrogenation of saturated hydrocarbons and more particularly to the dehydrogenation of saturated hydrocarbons by carbon dioxide whereby a mixture of the desired olefin and carbon monoxide is obtained, which mixture may be used directly in the synthesis of carboxylic acids.

It is well known that aliphatic carboxylic acids of three or more carbon atoms may be synthesized by reacting an olefin, of one less carbon atom than the desired acid, with carbon monoxide and steam in the presence of a suitable catalyst. Thus propionic acid may be synthesized from ethylene, carbon monoxide and steam by heating a mixture of these gases under superatmospheric pressure in the presence of a catalyst such as an activated charcoal, phosphoric acid, etc. Recently it has been discovered that greatly improved yields may be obtained by using nickel carbonyl as the catalyst in this reaction. By a similar reaction, propionic acid anhydride may be synthesized by reacting propionic acid with ethylene and carbon monoxide. These reactions provide an excellent opportunity for preparing these carboxylic acids and their anhydrides, not previously available in commercial quantities, on a commercial scale. However, the reaction is a sensitive one and, in order to avoid undesirable by-products which are separated from the desired acid product only with difficulty, requires the use of an olefin and carbon monoxide of a high degree of purity. Consequently, the raw material costs are high and it has not previously been possible to produce these acids or anhydrides by this synthesis on an economically sound basis.

Olefins have been prepared from saturated hydrocarbons by both pyrolytic and catalytic dehydrogenation of the hydrocarbons. The dehydrogenation is usually carried out in the presence of oxygen, which acts as a hydrogen acceptor, or of steam. However, side reactions such as carbon deposition, polymerization of the olefinic products, oxidation of the olefinic products to oxy-compounds, etc., occur in these processes to such an extent that only minor yields of the desired olefins are obtained. Many attempts have been made to reduce the amount of side reactions occurring, particularly that of carbon deposition which causes the frequent cracking of the walls of the reaction tubes at the high temperatures required for the reaction and also the inactivation of the catalyst. It has been suggested that the hydrocarbon gases and oxygen be separately preheated before passing them through the catalytic tube. It has also been suggested that the oxygen be diluted with various inert gases such as steam, nitrogen, etc. However, only a low degree of conversion is obtained and the catalyst invariably becomes deactivated due to carbon deposition. Hydrogen and carbon monoxide have also been added to the mixture of gases reacted in order to reduce the amount of carbon formed and so prolong the life of the catalyst although both of these gases have an adverse effect on the olefin production. In every case, a complex mixture of gases is obtained, which mixture must then be separated into its components in order that the olefin be usable in the acid or anhydride synthesis referred to above.

Now in accordance with this invention it has been found that saturated hydrocarbons may be dehydrogenated by heating them with carbon dioxide in contact with an iron oxide catalyst whereby a mixture of olefin and carbon monoxide is obtained which is suitable for direct use in the carboxylic acid or anhydride synthesis without any previous purification. In addition, this method of producing olefins has many advantages over the prior art processes. For example, it avoids any necessity of preheating the reactant gases as is required when oxygen is used as the hydrogen acceptor, it avoids polymerization side reactions, and carbon deposition. Furthermore, in utilizing carbon dioxide as one of the raw materials in the operation the cost of the olefin-carbon monoxide mixture required for the acid synthesis is greatly reduced. Thus, whether the product is used directly in the acid synthesis as described, or used as a process for obtaining only the olefin, the process in accordance with this invention is one easily and economically carried out for the production of olefins.

The following examples will illustrate the dehydrogenation of hydrocarbons by the process in accordance with this invention.

Example 1

Ethane and carbon dioxide, in the ratio of 1.77 moles of carbon dioxide per mole of ethane, were passed through a heated tube containing a promoted iron oxide catalyst at a temperature of 850° C. and a contact time of 0.986 second. The catalyst used was composed of 28.38% FeO, 65.93% $Fe_2O_3$, 0.40% $Al_2O_3$, 0.01% CuO, 0.6% $SiO_2$, 4.1% MgO, 0.40% CaO and 0.004% MnO and had been reduced by hydrogen previous to its use. The exit gases from the tube had the following volume analysis: 19.5% $C_2H_4$, 23.9%

CO, 34.7% $CO_2$, 6.4% $C_2H_6$, 14.6% $H_2$ and 0.9% $CH_4$. This represents a 68.7% conversion of ethane to ethylene and a 45% conversion of carbon dioxide to carbon monoxide. The mole ratio of carbon monoxide to ethylene in the exit gas was 1.22 to 1.

*Example 2*

A mixture of ethane and carbon dioxide in the ratio of 2.25 moles carbon dioxide to 1 mole of ethane, was passed over the same catalyst as in Example 1, at a contact time of 0.978 second and a temperature of 830° C. The exit gases had the following volume analysis: 17.4% $C_2H_4$, 18.7% CO, 9.1% $C_2H_6$, 46.7% $CO_2$ and 8.1% $H_2$. This represents a 62.5% conversion of ethane to ethylene and a 29.9% conversion of $CO_2$ to CO. The mole ratio of carbon monoxide to ethylene in the exit gas was 1.08 to 1.

*Example 3*

Ethane and carbon dioxide in a mole ratio of 1.54 carbon dioxide to 1 of ethane were passed through a tube containing a catalyst, consisting of iron and chromium oxides in the ratio of 7 parts of iron to 1 part of chromium, at a contact time of 0.217 second and a temperature of 830° C. The exit gases had the following analysis by volume: 12.6% $C_2H_4$, 12.3% CO, 21.5% $C_2H_6$, 46.2% $CO_2$, 3.7% $H_2$ and 3.7% $CH_4$. This represents a 34% conversion of ethane to ethylene and a 21.3% conversion of carbon dioxide. The mole ratio of carbon monoxide to ethylene in the exit gas was 1.03 to 1.

Any saturated hydrocarbon containing two or more carbon atoms per molecule may be dehydrogenated by the process in accordance with this invention. The process is particularly designed for those hydrocarbons which are normally gaseous or are low boiling liquids, but is equally applicable to liquid hydrocarbons if the latter are vaporized before passage through the catalytic cracking tube. As examples of specific hydrocarbons which may be dehydrogenated by this process are ethane, propane, butane, isobutane, pentane, isopentane, and higher hydrocarbons, or mixtures of any of these hydrocarbons. When the olefin-carbon monoxide product is to be used for acid or anhydride synthesis, it is preferable that the hydrocarbon raw material consist chiefly of one hydrocarbon as otherwise a mixture of acids would be produced. However, the process of this invention may be applied to a mixture of saturated hydrocarbons, in which case a mixture of olefins is prepared. Any source of hydrocarbon material may be used as, for example, natural gas, low boiling liquid hydrocarbons, the gas obtained from the pressure cracking of paraffin-base oils, various artificial or utility gases such as those produced by the thermal cracking of hydrocarbon oils, etc.

The hydrocarbon gas and carbon dioxide may be separately mixed and then fed into the cracking tube or the gases may be separately fed into the tube. If desired, the gases may be preheated before being passed through the catalyst chamber, but the process is readily carried out by direct heating of the catalyst chamber. If the hydrocarbon material being dehydrogenated is a normally liquid material, it is, of course, necessary to vaporize the hydrocarbon since the reaction takes place in the vapor or gaseous phase.

The proportion of carbon dioxide to hydrocarbon may be varied over a wide range but is in general dependent upon the temperature, contact time and the desired ratio of products. If the olefin-carbon monoxide mixture produced is to be used in the synthesis of a carboxylic acid or anhydride, the ratio of the reactant gases should be held within a molar ratio of carbon dioxide to hydrocarbon of about 0.9:1 to about 3:1 or more preferably within the range of from equimolar quantities of the two gases to two moles of carbon dioxide per mole of hydrocarbon. By maintaining the ratio of the reactant gases within these limits it is possible to produce the olefin and carbon monoxide mixture so that it contains these gases in approximately the equimolar quantities necessary for the acid synthesis.

The temperature of the catalytic tube through which the reactant gases are passed must be held at a relatively high temperature due to the endothermic nature of the reaction. The dehydrogenation reaction in accordance with this invention may be carried out at a temperature of about 750° C. to about 950° C., preferably at about 800° C. to about 875° C., and more preferably at about 830° C. to about 850° C.

In carrying out the dehydrogenation of hydrocarbons with carbon dioxide to produce a mixture of an olefin and carbon monoxide, it is necessary that the reactant gases be heated in contact with a catalyst. Catalysts which have been found to be effective in this reaction are the iron oxide catalysts such as iron oxide itself or any promoted iron oxide catalyst, the major proportion of which is iron oxide. For example, a carbon monoxide conversion-type catalyst such as a chrome oxide-iron oxide catalyst or an ammonia producer-type catalyst such as magnitite, the surface of which has been promoted with magnesium oxide, aluminum oxide and calcium oxide, may be used. Various other promoters such as nickel oxide, copper oxide, silica, manganese oxide, lithium or potassium may be used for the iron oxide catalyst. The iron oxide catalyst may be reduced with hydrogen before use, if desired. The catalyst may be used in any desired form as, for example, coarsely ground, pelleted, powder, fluid-type catalysts, or it may be a supported-type catalyst.

The reactant gases are passed either through or over the catalyst bed at such a rate that they are in contact with the catalyst at the reaction temperature for a period of time sufficient to bring about the dehydrogenation of the hydrocarbon to the olefin and at the same time the reduction of the carbon dioxide to carbon monoxide. Usually a contact time of about 0.07 to about 1 second is sufficient, but contact times up to about 3 seconds may be used without adversely affecting the reaction at the temperatures employed. Normally atmospheric pressures are used, but the reaction may also be carried out at either subatmospheric or superatmospheric pressures.

In general, the temperature, contact time and proportion of reactant gases used are governed by the type of product desired. By the proper selection of the inlet carbon dioxide to hydrocarbon ratio, contact time, and temperature, it is possible to obtain any desired ratio of carbon monoxide to olefin in the product gas. For example, for use in the synthesis of propionic acid or anhydride from ethylene, carbon monoxide and steam, it is desirable to have these gases in nearly equimolar quantities. As may be seen from the foregoing examples, by carrying out the dehydrogenation of ethane with carbon dioxide by the process in accordance with this invention, it is possible to prepare the product gas so that it contains practically equimolar quantities of ethylene and carbon monoxide, which product gas may then be used directly, or with little purification, in the acid synthesis. Thus, the catalytic cracking of a hydrocarbon and carbon dioxide provides an excellent method for the production of a synthesis gas for use in the synthesis of carboxylic acids or anhydrides, and makes the commercial production of these acids on an economical basis possible.

What I claim and desire to protect by Letters Patent is:

1. The process of dehydrogenating ethane to produce ethylene which comprises contacting a mixture of carbon dioxide and ethane, in a molar ratio of from about 0.9:1 to about 3:1, with an iron oxide catalyst, the major proportion of which is iron oxide, at a temperature of about 750° C. to about 950° C. for a period of about 0.07 to about 3 seconds.

2. The process of dehydrogenating ethane to produce ethylene which comprises contacting a mixture of carbon dioxide and ethane, in a molar ratio of from about 0.9:1 to about 3:1, with an iron oxide catalyst, the major proportion of which is iron oxide, at a temperature of about 800° C. to about 875° C. for a period of about 0.07 to about 3 seconds.

3. The process of preparing a mixture of ethylene and carbon monoxide suitable for use in the synthesis of propionic acid which comprises contacting a mixture of carbon dioxide and ethane, in a molar ratio of about 0.9:1 to about 3:1 with an iron oxide catalyst, the major proportion of which is iron oxide, at a temperature of about 800° C. to about 875° C. for a period of about 0.07 to about 3 seconds.

4. The process of preparing a mixture of ethylene and carbon monoxide suitable for use in the synthesis of propionic acid which comprises contacting a mixture of carbon dioxide and ethane, in a molar ratio of about 1:1 to about 2:1 with an iron oxide catalyst, promoted with chrome oxide, the major proportion of the catalyst being iron oxide, at a temperature of about 800° C. to about 875° C. for a period of about 0.07 to about 1 second.

5. The process of preparing a mixture of ethylene and carbon monoxide suitable for use in the synthesis of propionic acid which comprises contacting a mixture of carbon dioxide and ethane, in a molar ratio of about 1:1 to about 2:1 with an iron oxide catalyst, promoted with oxides of magnesium, aluminum and calcium, the major proportion of the catalyst being iron oxide, at a temperature of about 800° C. to about 875° C. for a period of about 0.07 to about 1 second.

6. The process of dehydrogenating ethane to produce ethylene which comprises contacting a mixture of carbon dioxide and ethane with an iron oxide catalyst, the major proportion of which is iron oxide, at a temperature of about 750° C. to about 950° C. for a period of less than about 3 seconds.

7. The process of claim 6 wherein the iron oxide catalyst contains at least one metal oxide promoter.

EERO O. ERKKO.

REFERENCES CITED

The following references are of record in the file of this patent:

UNITED STATES PATENTS

| Number | Name | Date |
| --- | --- | --- |
| 2,315,107 | Chickinoff et al. | Mar. 30, 1943 |
| 2,367,620 | Schulze et al. | Jan. 16, 1945 |

OTHER REFERENCES

Ser. No. 289,711, Nata (A. P. C.), published April 20, 1943.

Ser. No. 340,228, Nata (A. P. C.), published April 20, 1943.